United States Patent
Roeder et al.

(10) Patent No.: US 10,336,209 B2
(45) Date of Patent: Jul. 2, 2019

(54) METHOD AND DEVICE FOR OPERATING A BATTERY, IN PARTICULAR A LITHIUM ION BATTERY, IN A CONSUMER

(71) Applicant: Robert Bosch GmbH, Stuttgart (DE)

(72) Inventors: Patrick Roeder, Markgroeningen (DE); Niluefer Baba, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 15/112,747

(22) PCT Filed: Jan. 2, 2015

(86) PCT No.: PCT/EP2015/050008
§ 371 (c)(1),
(2) Date: Jul. 20, 2016

(87) PCT Pub. No.: WO2015/110272
PCT Pub. Date: Jul. 30, 2015

(65) Prior Publication Data
US 2016/0332530 A1 Nov. 17, 2016

(30) Foreign Application Priority Data
Jan. 22, 2014 (DE) .......... 10 2014 201 054

(51) Int. Cl.
*H02J 7/00* (2006.01)
*B60L 11/18* (2006.01)
(Continued)

(52) U.S. Cl.
CPC ......... *B60L 11/1861* (2013.01); *B60L 3/0046* (2013.01); *B60L 58/12* (2019.02);
(Continued)

(58) Field of Classification Search
USPC ................................................ 320/109, 132
See application file for complete search history.

(56) References Cited

U.S. PATENT DOCUMENTS

| 6,570,364 B2 * | 5/2003 | Haid ................ G01R 19/16542 320/136 |
| 7,202,574 B2 * | 4/2007 | Jabaji ...................... B60L 1/00 307/10.1 |

(Continued)

FOREIGN PATENT DOCUMENTS

| CN | 101286645 A | 10/2008 |
| CN | 103094636 A | 5/2013 |

(Continued)

OTHER PUBLICATIONS

International Search Report for Application No. PCT/EP2015/050008 dated Apr. 29, 2015 (English Translation, 2 pages).

*Primary Examiner* — Samuel Berhanu
(74) *Attorney, Agent, or Firm* — Michael Best & Friedrich LLP

(57) ABSTRACT

The present invention relates to a method and a device for operating a battery, in particular a lithium ion battery, in a load. For this purpose, a determination (S10) is carried out of at least one operating parameter which describes the state of the battery or the load, a comparison (S20) of the at least one determined operating parameter with one reference value in each case in order to recognize whether a predefined state exists, and a discharge (S32) of the battery until the charge state of the battery lies below a specified critical charge state of the battery if it has been identified that the predefined state exists, wherein by discharging the battery, an energy store is charged by a discharge flow from the battery.

12 Claims, 4 Drawing Sheets

(51) Int. Cl.
  *B60L 3/00* (2019.01)
  *H01M 10/42* (2006.01)
  *H01M 10/44* (2006.01)
  *B60L 58/12* (2019.01)
  *B60L 58/13* (2019.01)
  *B60L 58/20* (2019.01)
  *B60L 58/24* (2019.01)
  *B60L 58/25* (2019.01)
  *H01M 10/48* (2006.01)

(52) U.S. Cl.
  CPC .............. *B60L 58/13* (2019.02); *B60L 58/20* (2019.02); *B60L 58/24* (2019.02); *B60L 58/25* (2019.02); *H01M 10/4257* (2013.01); *H01M 10/44* (2013.01); *H01M 10/443* (2013.01); *H02J 7/0029* (2013.01); *H02J 7/0047* (2013.01); *B60L 2200/12* (2013.01); *B60L 2240/545* (2013.01); *B60L 2260/22* (2013.01); *H01M 10/48* (2013.01); *H01M 2010/4278* (2013.01); *H01M 2220/20* (2013.01); *H02J 2007/005* (2013.01); *Y02T 10/7011* (2013.01); *Y02T 10/7044* (2013.01); *Y02T 10/7066* (2013.01)

(56) References Cited

U.S. PATENT DOCUMENTS

| | | | |
|---|---|---|---|
| 2002/0096886 A1* | 7/2002 | Schmitz | B60K 6/46 290/40 C |
| 2003/0025479 A1* | 2/2003 | Kikuchi | H02J 7/0047 320/134 |
| 2006/0102397 A1 | 5/2006 | Buck et al. | |
| 2012/0299527 A1* | 11/2012 | Vo | B60L 3/0046 320/101 |
| 2013/0147434 A1 | 6/2013 | Boehm et al. | |
| 2013/0187465 A1* | 7/2013 | Abe | H01M 10/441 307/52 |
| 2014/0159665 A1 | 6/2014 | Boehm et al. | |

FOREIGN PATENT DOCUMENTS

| | | |
|---|---|---|
| CN | 104163114 A | 11/2014 |
| DE | 10233821 | 2/2004 |
| DE | 102009014386 | 9/2010 |
| DE | 102010002326 | 8/2011 |
| DE | 102010039913 | 3/2012 |
| DE | 102011082194 | 3/2013 |
| EP | 1229339 | 8/2002 |
| EP | 1846776 | 8/2011 |
| EP | 2360485 | 8/2011 |
| JP | H09308013 A | 11/1997 |
| JP | 2001314046 A | 11/2001 |
| JP | 2002010504 A | 1/2002 |
| JP | 2008061432 A | 3/2008 |
| JP | 2009247057 A | 10/2009 |
| JP | 2010022155 A | 1/2010 |
| JP | 2012075280 A | 4/2012 |
| JP | 2013027288 A | 2/2013 |
| JP | 2013035534 A | 2/2013 |
| JP | 5287089 B2 | 9/2013 |
| WO | 2012101681 A1 | 8/2012 |
| WO | 2013076806 A1 | 5/2013 |

* cited by examiner

METHOD AND DEVICE FOR OPERATING A BATTERY, IN PARTICULAR A LITHIUM ION BATTERY, IN A CONSUMER

BACKGROUND OF THE INVENTION

The present invention relates to a method and a device for operating a battery, in particular a lithium ion battery, in a consumer (load).

Rechargeable batteries, in particular lithium ion batteries, are used in a multiplicity of products as energy stores. Currently available lithium ion batteries are challenging from a safety point of view. In the event of an accident, the battery can burn, emit toxic gases and dusts and even explode. The thermal runaway in the case of lithium ion batteries is primarily due to the accelerated oxidation of an organic electrolyte (frequently organic carbonates, such as, e.g., ethyl carbonate (EC), dimethyl carbonate (DMC), diethyl carbonate (DEC), etc.) at high temperatures. The decisive factor here is the exothermal self-acceleration, which a battery undergoes up to the eventual fire and the thermal runaway associated therewith. The fire is ultimately triggered by the release of oxygen by the metal oxide cathode material, which together with the organic of the electrolyte produces a combustible mixture. $LiCoO_2$ and $LiNiO_2$ are known for such instabilities.

By means of more stable cathode materials, such as, e.g., the so-called NCM or respectively NMC (Ni—Co—Mn based), the release of oxygen can be shifted to higher temperatures and the danger of a fire is thus reduced. Besides the composite oxide NCM, the so-called NCA (Ni—Co—Al based) is also used. Batteries which are NCA based on the cathode side are often used for high performance applications, such as, e.g., E-bikes. NCA based batteries are, however, more challenging from a safety perspective in comparison to other batteries that are based on oxidic cathode material. The primary reason for this is due to the high nickel content, which as a NCA represents a comparatively instable structure and can release oxygen at elevated temperatures. Said oxygen reacts strongly with the organic electrolyte and leads to a so-called thermal runaway, which in turn can lead to a fire or an explosion.

In order to prevent this, there is a need for a safe and reliable management of such a battery.

SUMMARY OF THE INVENTION

The method according to the invention for operating a battery, in particular a lithium ion battery, in a consumer (load), comprises: a determination of at least one operating parameter which describes the state of the battery or the load, a comparison of the at least one determined operating parameter with one reference value in each case in order to recognize whether a predefined state exists, and a discharge of the battery until the charge state of the battery lies below a specified critical charge state of the battery if it has been identified that the predefined state exists, wherein by discharging the battery, an energy store is charged by a discharge flow from the battery.

The device according to the invention for operating a battery, in particular a lithium ion battery, in a consumer (load) comprises a detection unit equipped to determine at least one operating parameter which describes the state of the battery or the load, an evaluation unit equipped to compare the at least one operating parameter with one reference value in each case in order to recognize whether a predefined state exists, and a discharge unit equipped to discharge the battery until the charge state of the battery lies below a specified critical charge state of the battery if it has been identified that such a defined state exists, wherein when discharging the battery, an energy store is charged by a discharge flow from the battery. In so doing, a thermal runaway of the battery is prevented because the battery is brought into a safe state of charge, in which a thermal runaway is not possible, if it is apparent that the battery is in a predefined state in which the full power output of the battery is not required. The safety of the battery is thus improved.

It is advantageous if the energy store is an additional battery. The additional battery particularly has a lower energy storage capacity than the operated battery. In this way, storage losses can be kept to a minimum. Furthermore, only a minimum additional weight has thus to be used to store the energy, which is particularly advantageous in a mobile application of the battery.

It is furthermore advantageous if the energy store is an additional consumer (load), which is equipped to store energy for the operation of the additional load. Such additional loads are often already available in the vicinity of the load and can be integrated in accordance with the invention, whereby a cost advantage can in turn be achieved. In addition, the service life of the additional load can be achieved in this way along with a simultaneous gain in safety.

The consumer is particularly a vehicle. One of the operating parameters is a speed of the vehicle, and a predefined state exists when there is no movement of the vehicle. As a result, it is ensured that a full power output of the battery is provided during a driving operation of the vehicle.

It is furthermore advantageous if the consumer is a vehicle and one of the operating parameters is a sensor signal that indicates whether a standing support of the vehicle has been folded out and if the predefined state exists if the standing support is folded out. As a result, it is ensured that a full power output of the battery is provided during a driving operation of the vehicle. In this case, the simplest of sensor means (e.g. a switch) can be used for determining the operating parameter and thus a cost advantage as well as a weight advantage is achieved.

It is likewise advantageous if a temperature of the battery is one of the operating parameters and if the predefined state exists if the temperature of the battery lies above a predefined temperature threshold value. In so doing, a critical state of the battery can be identified with a high degree of reliability. The specified critical state of the battery lies particularly between 80% and 90% of the full state of charge of the battery. This is advantageous because a thermal runaway of the battery is particularly probable above this state of charge. At the same time, the battery is not unnecessarily extensively discharged and provides a maximum amount of energy with a maximum amount of safety.

It is advantageous if energy stored in the energy store is used to charge the battery if the defined state no longer exists. It is thus ensured that the safety of the system is increased with a minimum energy loss and the entire stored energy of the battery is available to the consumer (load).

It is likewise advantageous if the predefined state is only then determined to exist if at least one of the operating parameters of the battery and/or the load exists over a predetermined time interval. Losses due to an unnecessary discharging and charging of the battery are thus reduced if a state occurs only temporarily or randomly.

BRIEF DESCRIPTION OF THE DRAWINGS

Exemplary embodiments of the invention are described below in detail with reference to the accompanying drawings. In the drawings.

DETAILED DESCRIPTION

Figure 1:
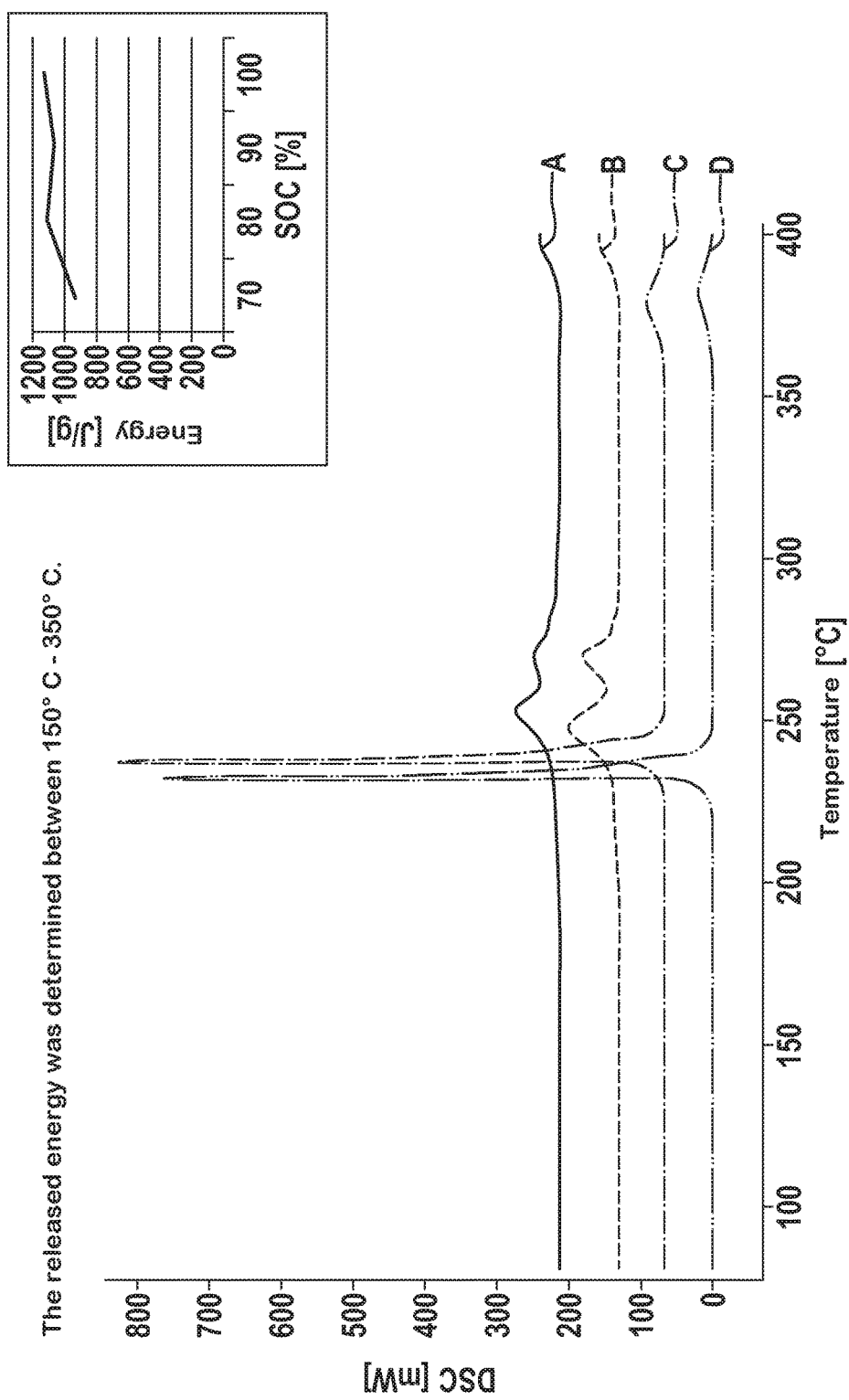
FIG. 1 shows a diagram which shows the result of a DSC measurement of an NCA (Ni—Co—Al) battery comprising an electrolyte.

FIG. 1 is a diagram which shows the result of a DSC measurement, i.e. a dynamic differential scanning calorimetry, an NCA cathode (Ni—Co—Al based) comprising a suitable electrolyte in a battery.

A cathode material denoted as NCA represents the abbreviation for $Li[Ni_{0.8}Co_{0.15}Al_{0.05}]O_2$. This is regarded as an unsafe cathode material due to the small thermal stability thereof. Batteries which are NCA based have a comparatively poor safety behavior. An increase in temperature can occur in the battery due to thermal, electrical and mechanical stress. Said increase in temperature is driven by different exothermic reactions. These include among other things the exothermic decomposition of the cathode material, which releases oxygen. This oxygen can combust with the organic of the electrolyte at elevated temperatures. In the worst case, a so-called thermal runaway occurs. Such exothermic cell component reactions are analyzed by means of the dynamic differential scanning calorimetry.

In FIG. 1, the result of a series of experiments can be seen, in which charged NCA has been analyzed in the presence of a commercial electrolyte (1M $LiPF_6$ in EC/DMC, 1:1 w/w) for lithium ion batteries by means of DSC analytics. The state of charge of the cathode material was thereby varied. To this end, a complete commercial battery was brought to different states of charge by means of a charging system. The cathode material was obtained by opening the battery in a protective gas atmosphere. It can be seen in FIG. 1 (on the upper right hand side) that the relatively released energy changed only insignificantly for the different analyzed states of charge (SOC). The released energy is nevertheless very high in comparison to other commercially used cathode materials (e.g. $LiCoO_2$).

The measurement was carried out for different states of charge (SOC) of the battery. A first graph A depicted by a solid line thus shows the behavior of the NCA in a state of charge of the battery of 40% (SOC of 40%) of the maximum possible state of charge. A second graph B depicted by a dashed line shows the behavior of the NCA in a state of charge of the battery of 80% (SOC of 80%) of the maximum possible state of charge. A third graph C depicted by a dot-dashed line shows the behavior of the NCA in a state of charge of 90% (SOC of 90%) of the maximum possible state of charge. A fourth graph D depicted by a double dot-dashed line shows the behavior of the NCA in a maximum possible state of charge (SOC of 100%). Each graph A, B, C, D shows respectively the energy released by the NCA across a temperature range of approximately 80 degrees Celsius to approximately 400 degrees Celsius.

FIG. 1 shows that there is a significant change in the course of the exothermic DSC curve beneath a SOC of 90%. This indicates decelerated kinetics. Not only the absolutely (in [J]) or relatively (in [J/kg]) released energy is of importance for the safety of an electrode material and the complete battery constructed therefrom. The output rate or respectively kinetics with which said energy is released in the event of an accident is likewise of importance. In the case of higher states of charge (>SOC of 90%), the time up to a thermal runaway is significantly shortened; whereas in the case of states of charge less than or equal to a critical state of charge $SOC_{krit}$, the kinetics of the exothermic reaction are greatly decelerated, which can be seen in the graphs A and B for an SOC<80%. The critical state of charge $SOC_{krit}$ therefore denotes the largest possible SOC threshold value at which a comparably strong decline in the released energy per unit of time was observed in the DSC, as for an SOC<80%, i.e. a slow reaction time is observed. In so doing, the critical state of charge $SOC_{krit}$ lies in the range of:

$$SOC \text{ of } 90\% > SOC_{krit} > SOC \text{ of } 80\%$$

The exact value of the critical state of charge $SOC_{krit}$ can be determined using a finer screening.

It should be noted that the diagram shown in FIG. 1 is only presented by way of example and the graphs can vary depending on the cathode material and the electrolyte.

Figure 2:
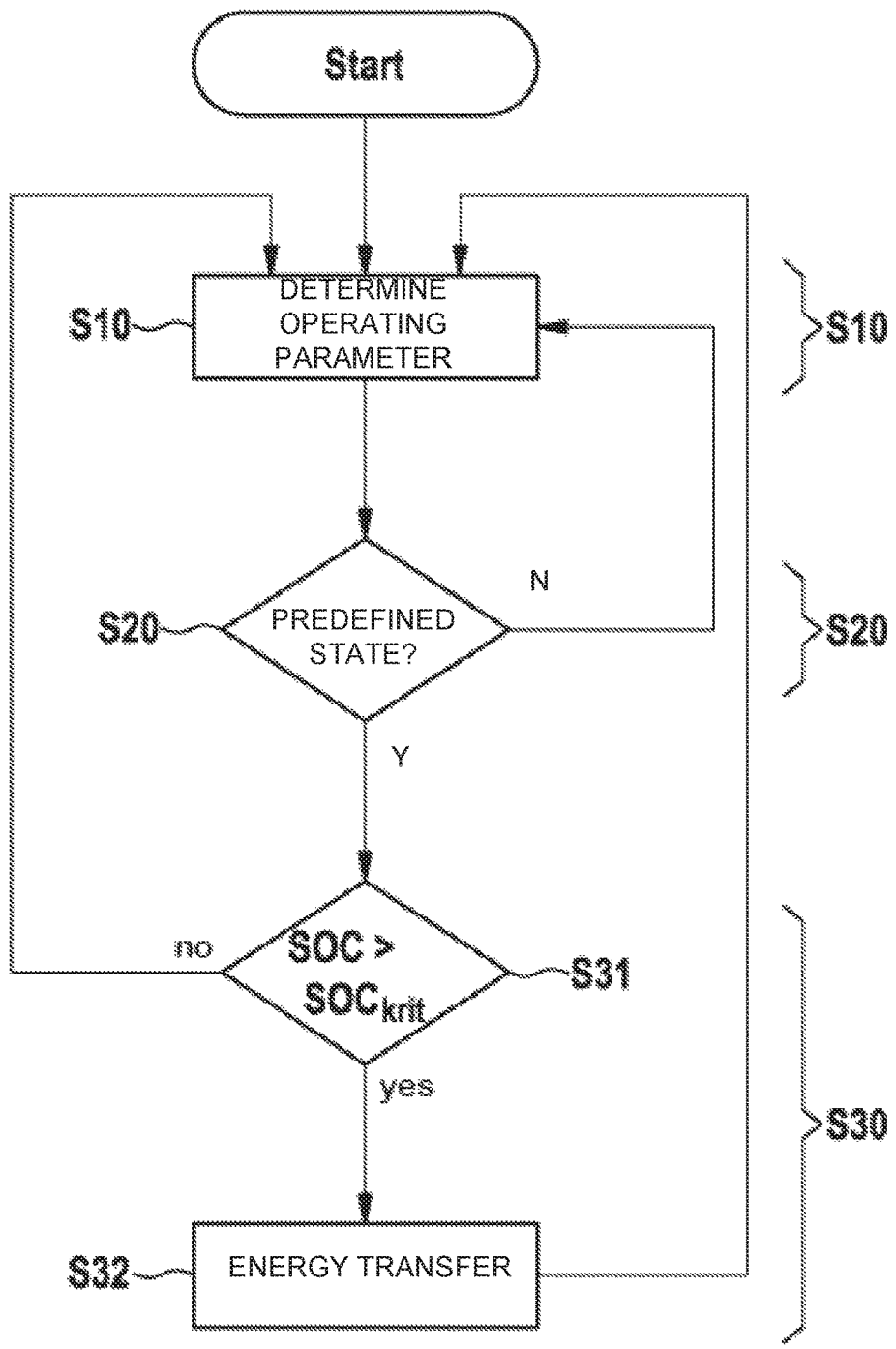
FIG. 2 shows a flow diagram of a method for operating a battery in a load in a first preferred embodiment according to the invention.

FIG. 2 shows a flow diagram of a method for operating a battery in a consumer (load) in a first preferred embodiment according to the invention. In this first embodiment, the load is an electric bicycle and the battery is a lithium ion battery 1. The method is started once and is carried out as long as the lithium ion battery 1 is coupled to the load, i.e. to the electric bicycle. After starting the method, a first step S10 of the method is carried out.

In the first step S10 of the method, at least one operating parameter is determined, which describes the state of the lithium ion battery 1 or the load. In this first embodiment, an operating parameter is determined which describes the state of the electric bicycle. This operating parameter is a switching state of a switch 12 (see FIG. 4) disposed on a bicycle stand 13, by means of which switch 12 the position of the bicycle stand is determined. A bicycle stand that has been folded out describes a first state, in which the bicycle is not in use, i.e. is parked. In this first state, the switch 12 is in a first position and emits a sensor value of "1". A folded-in bicycle stand describes a second state, in which the bicycle is in use. In this second state, the switch 12 is in a second position and emits a sensor value of "0". After determining the operating parameter, a second step S20 of the method is carried out.

In the second step S20 of the method, the at least one determined operating parameter is compared with respectively one reference value in order to detect whether a predefined state exists. The predefined state is the first state in this case. The reference value for the switch 12 is "1" and is thus the value which describes that the switch 12 is in the first position and the bicycle stand is folded out. The reference value for the switch is compared with the sensor value emitted from the switch 12. If the reference value (here "1") is equal to the sensor value, the predefined state then exists and a third step S30 of the method is carried out. If the reference value (here "1") is not equal to the sensor value, the predefined state then does not exist and the method branches back to the first step S10 of said method. In other words, the first step S10 of the method and the second step S20 of the method are carried out until the bicycle is no longer in use, is therefore parked. Only then is the third step S30 of the method carried out.

In the third step S30 of the method, the battery is discharged until the state of charge of the battery lies below a specified critical charge state $SOC_{krit}$ of the lithium ion battery 1. In so doing, an energy store is charged by a discharge flow from the lithium ion battery 1 when said lithium ion battery 1 is being discharged. To this end, the third step S30 of the invention comprises a state of charge evaluation S31 and an energy transfer S32. If the third step S30 of the method is triggered, the one state of charge evaluation S31 then initially occurs.

In the state of charge evaluation S31, it is evaluated whether the charge state of the lithium ion battery 1 lies below a given critical charge state $SOC_{krit}$ of the lithium ion battery. To this end, a current state of charge $SOC_{akt}$ of the lithium ion battery 1 is queried. This value could, for example, be drawn from a battery control of the lithium ion battery 1. The critical charge state $SOC_{krit}$ lies at 85% of the maximum possible state of charge of the lithium ion battery 1 in this first embodiment and therefore below a state of charge in which a thermal runaway probably occurs. The current state of charge $SOC_{akt}$ of the lithium ion battery 1 is compared with the critical state of charge $SOC_{krit}$. If the actual state of charge $SOC_{akt}$ is less than or equal to the critical state of charge $SOC_{krit}$, the method then branches back to the first step S10 of the method because the lithium ion battery is already in a safe state. If the current state of charge $SOC_{akt}$ is greater than the critical state of charge $SOC_{krit}$, the energy transfer S32 is then carried out.

During the energy transfer S32, the lithium ion battery 1 is discharged and the energy released by discharging the lithium ion battery is used to charge the energy store. In this first embodiment, the energy store is an additional battery 9 which has maximally 30% of the capacity of the lithium ion battery 1 because said additional battery only temporarily stores a portion of the energy of the lithium ion battery. Because the lithium ion battery is not to be completely discharged, but only until the actual state of chare $SOC_{akt}$ of the lithium ion battery 1 lies below the critical state of charge $SOC_{krit}$, the energy transfer 32 is limited to a predefined period of time. After this period of time has elapsed, the method branches back to the first step S10 of the method. Should the current state of charge of the battery $SOC_{akt}$ not yet lie below the critical state of charge $SOC_{krit}$, a renewed energy transfer 32 then occurs if the method again leads into the energy transfer 32 after a repeated execution of the first step S10 of the method, the second step S20 of the method and the state of charge evaluation S31.

The energy store is optionally an additional consumer (load) which is equipped to store energy for the operation of the additional consumer. The energy store is, for example, a display module, which is mounted to the handlebar of the electric bicycle. This display module comprises a storage unit for storing energy, such as, for example, a further battery or a capacitive energy store. This storage unit is charged via the battery and a certain amount of energy is used at the same time to operate the display module. It is particularly advantageous in this context if energy intensive operations of the display module are carried out at this point in time.

Figure 3:
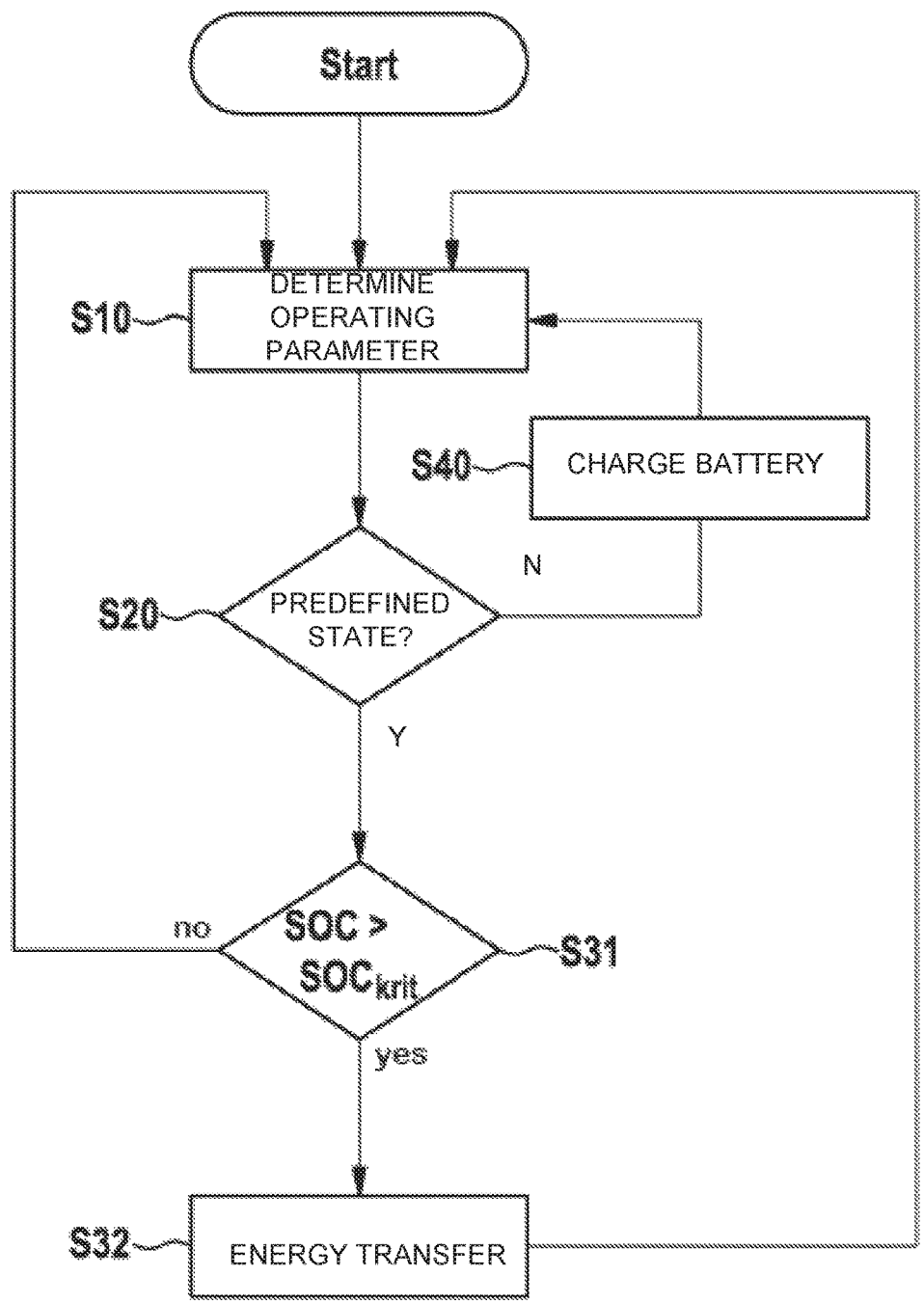
FIG. 3 shows a flow diagram of a method for operating a battery in a load in a second preferred embodiment according to the invention.

FIG. 3 shows a flow diagram of a method for operating a battery in a consumer in a second preferred embodiment according to the invention. The second embodiment corresponds to the first embodiment; however, the energy stored in the energy store is used to charge the lithium ion battery 1 if the defined state no longer exists. The second embodiment is therefore different from the first embodiment by virtue of the fact that the method does not directly jump back to the first step S10 of the method if the predefined state does not exist, but a fourth step S40 of the method is carried out before the first step S10 of the method is again carried out. In the fourth step S40 of the method, the lithium ion battery 1 is charged by the energy stored in the energy store.

A first preferred alternative embodiment of the method according to the invention corresponds to the first or the second preferred embodiment according to the invention; however, the operating parameter determined in the first step S10 of the method is a current speed of the electric bicycle, which is determined by a speed sensor, or is drawn from a tachometer. In the second step S20 of the method, the reference value is a reference speed of the electric bicycle. This reference speed is a speed of 0 km/h. If the current speed of the electric bicycle corresponds to the reference speed, the predefined state then exists and the third step S30 of the method is carried out. The predefined state only then exists in this embodiment if the operating parameter exists over a predefined time interval. That is to say the speed of 0 km/h is, for example, measured over a period of time of 45 min. In so doing, a discharge of the lithium ion battery during short stoppages (e.g. at a red light) is prevented. If the current speed of the electric bicycle does not correspond to the reference speed, the predefined state then does not exist and the method branches back to the first step S10 of the method. In other words, the first step S10 of the method and the second step S20 of the method are carried out until the bicycle is standing over a period of time of 45 minutes. Only then is the third step S30 of the method carried out.

A second preferred alternative embodiment of the method according to the invention corresponds to the first or the second preferred embodiment according to the invention; however, the operating parameter determined in the first step S10 of the method is a current temperature of the lithium ion battery 1 which is detected by a temperature sensor or is ascertained by means of another method for determining temperature, e.g. by means of a determination of the temperature via a measurement of the impedance of the lithium ion battery 1. In the second step S20 of the method, the reference value is a reference temperature. This reference temperature is a temperature of 60 degrees Celsius. If the current temperature of the lithium ion battery 1 exceeds the reference temperature, the predefined state then exists and the third step S30 of the method is carried out. If the current temperature of the lithium battery is less than or equal to the reference temperature, the predefined state then does not exist and the method branches back to the first step S10 of the method. In other words, the first step S10 of the method and the second step S20 of the method are carried out until the current temperature of the lithium ion battery 1 is above 60 degrees Celsius. It is thereby advantageous if the method is only carried out during an operation of the electric bicycle.

In the second preferred alternative embodiment, the lithium battery 1 is now monitored by a temperature sensor. If the temperature of the lithium ion battery 1 exceeds a critically defined temperature, e.g. 60 degrees Celsius, the lithium ion battery 1 is then discharged until said battery has a state of charge less than the critical state of charge $SOC_{krit}$. The discharge flow is stored in a battery specifically defined for this purpose (e.g. an additional lithium ion battery) and fed back if required. The discharge flow is, however, only then fed back if the temperature of the lithium ion battery 1 has fallen below the temperature defined as critical. If a temporary increase in temperature above the temperature defined as critical occurs (e.g. for a time interval of less than a minute) as a result of a strong acceleration, the lithium ion battery 1 is then not yet discharged in accordance with the invention. Only if the increase in temperature of the lithium ion battery 1 lies above the temperature defined as critical longer than a critical period of time, is the lithium ion battery 1 discharged pursuant to the third step S30 of the method.

In general, any predefined states can be identified by means of a corresponding selection of sensors. A state is either defined by a single sensor signal or by a predefined combination of a plurality of sensor signals. In so doing, each sensor signal can be compared with a respectively associated reference value. A predefined state could, for example, then only exist if the electric bicycle is in motion, i.e. the current speed of the electric bicycle is not equal to 0 km/h, and the temperature of the lithium ion battery 1 is above 60 degrees Celsius.

Figure 4:
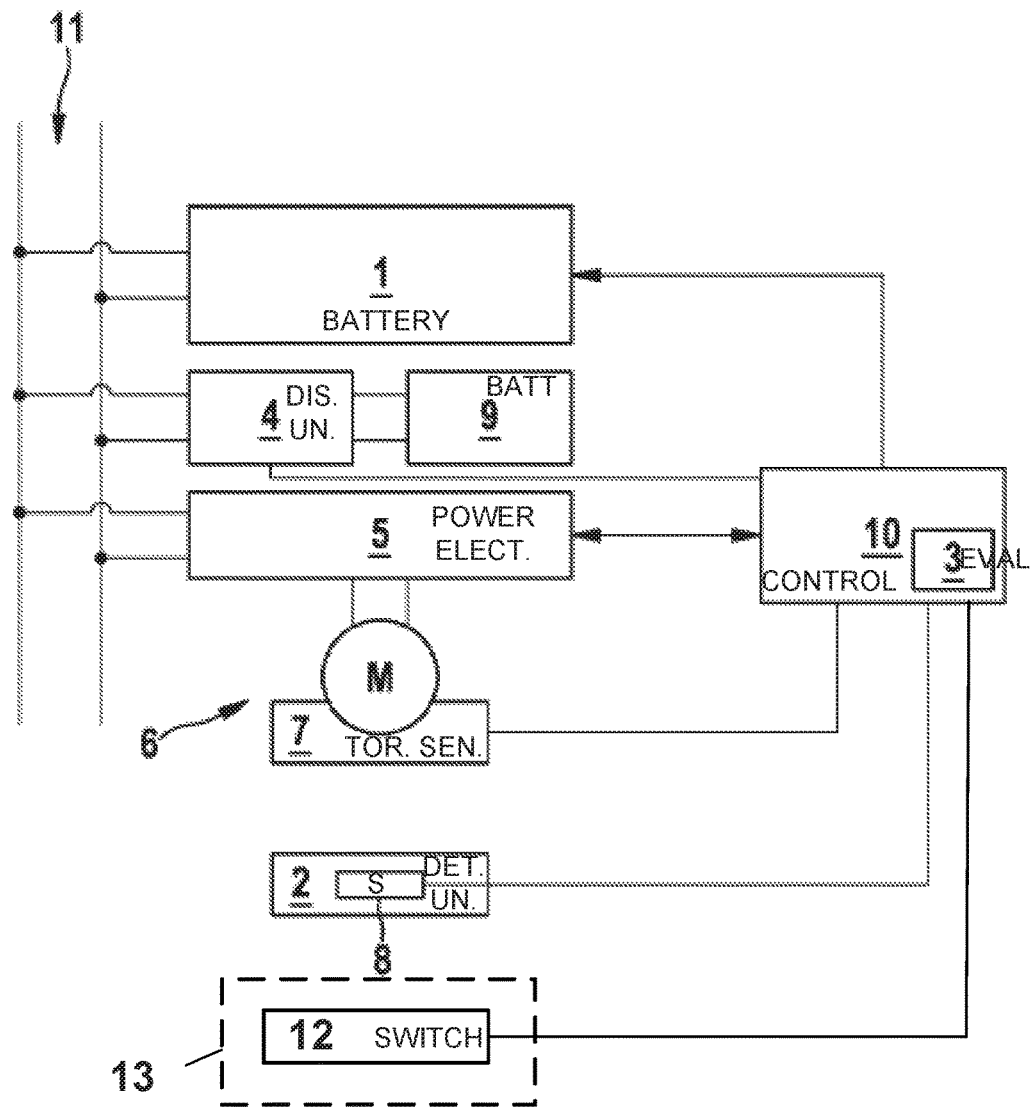
FIG. 4 shows a schematic depiction of the electrical components of an electric bicycle comprising a device for operating a battery.

FIG. 4 shows a schematic depiction of the electrical components of an electric bicycle comprising a device for operating a lithium ion battery 1. The electric bicycle comprises the lithium ion battery 1. The two voltage poles of the lithium ion battery 1 are connected to respectively one bus line of a DC bus 11 so that a battery voltage of the lithium ion battery 1 is applied to the DC bus. Power electronics 5 are supplied with the battery voltage via the DC bus 11. The power electronics 5 are connected to a motor 6, which is equipped to drive the electric bicycle. The power electronics 5 make an actuation of the motor 6 possible. The motor 6 comprises a torque sensor 7, which is coupled to a control unit 10 and transmits a torque of the motor 6 to the control unit 10.

The electric bicycle further comprises a detection unit 2 which is equipped to detect at least one operating parameter that describes the state of the lithium ion battery 1 or of the electric bicycle. To this end, the detection unit 2 comprises, for example, a speed sensor 8 on the back wheel of the electric bicycle. The signals of the speed sensor 8 of the detection unit 2 are transmitted to an evaluation unit 3 and to the control unit 10. The torque of the motor 6 and the speed detected by the speed sensor 8 are converted into a control signal by the control unit 10, said control signal being transmitted to the power electronics 5 in order to control the motor 6 in accordance with the torque.

The electric bicycle furthermore comprises the evaluation unit 3, which is equipped to compare the at least one operating parameter with respectively one reference value in order to recognize whether a predefined state exists. The evaluation unit 3 is comprised by the control unit 10 in the schematic depiction shown. The evaluation unit 3 compares the signals of the speed sensor 8 and recognizes that a predefined state exists if the signals of the speed sensor 8 indicate a speed of 0 km/h. If the predefined state has been identified, a discharge signal is then transmitted to a discharge unit 4. If the predefined state was not identified, a charge signal is then transmitted to the discharge unit 4.

The electric bicycle furthermore comprises the discharge unit 4. The discharge unit 4 is coupled to the DC bus 11. An additional battery 9 is coupled as an energy store to the discharge unit 4. If the discharge signal is received by the discharge unit 4, the discharge unit 4 then couples the additional battery 9 to the DC bus 11 in such a way that the additional battery 9 is charged via said DC bus and thus by the lithium ion battery 1. If the charge signal is received by the discharge unit 4, the discharge unit 4 then couples the additional battery to the DC bus 11 in such a way that the additional battery 9 is discharged via said DC bus. The energy provided on the DC bus 11 as a result of this discharge is either used to charge the lithium ion battery 1 or is used by any other arbitrary load, e.g. by the motor 6.

The device charges the lithium battery 1 during a rest phase, e.g. overnight, only up to the critical state of charge $SOC_{krit}$. The remaining required capacity is held in the energy store, i.e. in the additional battery 9, for use if required.

The present invention was described by way of example with the aid of an electric bicycle. The device according to the invention or respectively the method according to the invention can likewise be used in other battery operated electrical consumers, such as, e.g., electric vehicles, hybrid vehicles, tools and particularly any type of portable or mobile consumers. This is particularly then possible if the temperature of the battery is used to identify the predefined state.

The device according to the invention can particularly be integrated into a battery system, wherein the method according to the invention is controlled, for example, by a battery controller. In this case, it is advantageous if the predefined state is a state of the battery.

In addition to the above written disclosure, reference is explicitly made to the disclosure of FIGS. 1 to 4.

The invention claimed is:

1. A method for operating a battery in a consumer, the method comprising:
    determining (S10) at least one operating parameter which describes the state of the battery or the consumer;
    comparing (S20) the at least one determined operating parameter with one reference value in each case in order to recognize whether a predefined state exists;
    determining a specified critical charge state ($SOC_{krit}$), the specified critical charge state ($SOC_{krit}$) being an upper charge state limit below which a thermal runaway of the battery does not occur; and
    discharging (S32) the battery until a charge state of the battery is below a specified critical charge state ($SOC_{krit}$) of the battery if the predefined state exists, wherein by discharging the battery, an energy store is charged by a discharge flow from the battery.

2. The method according to claim 1, wherein the energy store is an additional battery.

3. The method according to claim 1, wherein the energy store is an additional consumer equipped to store energy for the operation of the additional consumer.

4. The method according to claim 1, wherein
    the consumer is a vehicle,
    one of the operating parameters is a speed of the vehicle, and
    the predefined state exists if there is no movement of the vehicle.

5. The method according to claim 1, wherein
    the consumer is a vehicle,
    one of the operating parameters is a sensor signal that indicates whether a standing support of the vehicle is folded out, and
    the predefined state exists if the standing support of the vehicle is folded out.

6. The method according to claim 1, wherein
    one of the operating parameters is a temperature of the battery, and
    the predefined state exists if the temperature of the battery is above a predetermined temperature threshold value.

7. The method for operating a battery according to claim 1, wherein the specified critical charge state of the battery lies between 80% and 90% of the full state of charge of the battery.

8. The method for operating a battery according to claim 1, wherein energy stored in the energy store is used to charge the battery if the defined state no longer exists.

9. The method for operating a battery according to claim 1, wherein the predefined state is only determined to exist if at least one of the operating parameters of the battery and/or the consumer exists over a predetermined time interval.

10. A device for operating a battery in a consumer, the device comprising:
   a detection unit (2) which is configured to detect at least one operating parameter which describes the state of the battery or of the consumer,
   an evaluation unit (3) which is configured to compare the at least one operating parameter with one reference value in each case in order to recognize whether a predefined state exists, and
   a discharge unit (4) which is configured to discharge the battery, when the predefined state exists, until the charge state of the battery lies below a specified critical charge state $SOC_{krit}$ of the battery, wherein an energy store (9) is charged by a discharge flow of the battery when the battery is being discharged;
   wherein the specified critical charge state ($SOC_{krit}$) is an upper charge state limit below which a thermal runaway of the battery does not occur.

11. The device according to claim 10, wherein the device is a lithium ion battery (1).

12. The method according to claim 1, wherein the battery is a lithium ion battery (1).

* * * * *